US007455581B2

(12) United States Patent
Gehring et al.

(10) Patent No.: US 7,455,581 B2
(45) Date of Patent: Nov. 25, 2008

(54) AIR DUCT OUTLETS WITH REMOTELY-LOCATED JOYSTICK LOUVER CONTROLS

(75) Inventors: Thomas Franz Josef Gehring, Scarborough (CA); Ireneusz Jankowski, Richmond Hill (CA); Dejan Havidic, Toronto (CA); Jeffrey A. McKerrall, Toronto (CA)

(73) Assignee: Johnson Controls, Inc., Milwaukee, WI (US)

( * ) Notice: Subject to any disclaimer, the term of this patent is extended or adjusted under 35 U.S.C. 154(b) by 287 days.

(21) Appl. No.: 11/234,030

(22) Filed: Sep. 23, 2005

(65) Prior Publication Data

US 2006/0172680 A1 Aug. 3, 2006

Related U.S. Application Data

(60) Provisional application No. 60/612,959, filed on Sep. 24, 2004.

(51) Int. Cl.
*B60H 1/347* (2006.01)
*B60H 1/34* (2006.01)

(52) U.S. Cl. ...................................................... 454/155

(58) Field of Classification Search .................. 454/155
See application file for complete search history.

(56) References Cited

U.S. PATENT DOCUMENTS

| | | | | |
|---|---|---|---|---|
| 2,969,725 | A * | 1/1961 | Grace et al. | 454/155 |
| 4,006,673 | A | 2/1977 | Meyer et al. | |
| 4,345,510 | A | 8/1982 | Sterett | |
| 4,702,156 | A | 10/1987 | Sano | |
| 6,893,338 | B2 * | 5/2005 | Katagiri et al. | 454/155 |

* cited by examiner

*Primary Examiner*—Steven B. McAllister
*Assistant Examiner*—Helena Kosanovic
(74) *Attorney, Agent, or Firm*—Myers Bigel Sibley & Sajovec, P.A.

(57) ABSTRACT

An air duct outlet includes a housing having a front wall with an opening therein through which air flows. A louver assembly is operably coupled with the housing and includes a first set of louvers pivotally secured within the housing, and a second set of louvers pivotally secured within the housing. A joystick is remotely positioned relative to the front wall opening away from the front wall opening. The joystick is operably coupled with the first and second sets of louvers and is configured to pivot the first and second sets of louvers in response to user movement thereof. The joystick is connected to the first set of louvers via a shaft and is connected to the second set of louvers via multiple interconnected linkages. The linkages are configured to allow the joystick to move the first set of louvers without moving the second set of louvers.

6 Claims, 9 Drawing Sheets

$D_1$
$D_1$
$D_1$
$D_1$
4
4
7
7
12
74
80
81
52
52
23
23
50
21
20a
20
92
18
31
31
31
$D_2$
20b
82
30b
30
30
30a
84
83
60

18
31
31
90a
90b
80
74
84
30
81
82
83
33
62
60
33
31
33
62
31
33
31

AIR DUCT OUTLETS WITH REMOTELY-LOCATED JOYSTICK LOUVER CONTROLS

RELATED APPLICATION

This application claims the benefit of and priority to U. S. Provisional Patent Application No. 60/612,959 filed Sep. 24, 2004, the disclosure of which is incorporated herein by reference as if set forth in its entirety.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated air. Because it is generally desirable for vehicle occupants to be able to adjust the direction of air flow within a vehicle interior, air duct outlets are typically provided with adjustable louvers. In addition, air duct outlets may be provided with dampers for allowing vehicle occupants to control the amount of air flowing therethrough.

Various types of air duct outlets can be provided depending upon special functions, air directability and design constraints within the vehicle. See, for example, U.S. Pat. Nos. 4,345,510; 4,702,156; and 4,006,673. Vehicle manufacturers are continuously seeking components, such as air duct outlets, that have enhanced functionality and durability, yet are cost effective to manufacture. Vehicle manufacturers are also continuously seeking components, such as air duct outlets, that can enhance styling within a vehicle, yet remain functional and economical.

SUMMARY OF THE INVENTION

In view of the above discussion, air duct outlets having remotely located joystick controls are provided. According to embodiments of the present invention, an air duct outlet includes a housing having a front wall with an opening therein through which air is allowed to flow. A louver assembly is operably coupled with the housing and is configured to adjust the direction of air flowing through the front wall opening. The louver assembly includes a first set of generally parallel louvers that are pivotally secured within the housing in spaced-apart adjacent relationship, and a second set of generally parallel louvers pivotally secured within the housing in spaced-apart adjacent relationship. The second set of louvers are positioned upstream from the first set of louvers within the housing.

The louvers in the first set are operably connected together such that pivotal movement of any one of the louvers in the first set causes pivotal movement of the remaining louvers in the first set. Similarly, the louvers in the second set are operably connected together such that pivotal movement of any one of the louvers in the second set causes pivotal movement of the remaining louvers in the second set. The louvers in the first set pivot about generally parallel axes. Similarly, the louvers in the first set pivot about generally parallel axes. The pivot axes of the first and second sets of louvers are substantially transverse relative to one another and may be substantially orthogonal relative to one another.

A joystick is remotely positioned relative to the front wall opening and does not interfere with air flowing through the front wall opening. The joystick is operably coupled with the first and second sets of louvers and is configured to pivot the first and second sets of louvers in response to user movement thereof. According to embodiments of the present invention, the joystick may extend from the front wall of the housing via a second opening formed therein. The joystick is connected to the first set of louvers via a shaft and is connected to the second set of louvers via multiple interconnected linkages. The linkages are configured to allow the joystick to move the first set of louvers without moving the second set of louvers.

Air duct outlets according to embodiments of the present invention allow for improved air flow directability because a user's hand does not interfere with the air stream coming from the outlet. Moreover, because the joystick control is no longer positioned within the air stream (and thereby blocking air flow), the effective outlet opening is increased. Accordingly, air duct outlets according to embodiments of the present invention can be smaller than conventional air duct outlets. Moreover, louvers within air duct outlets according to embodiments of the present invention can be smaller than conventional air duct outlet louvers, and without inducing unwanted pressure drops.

Air duct outlets according to embodiments of the present invention can facilitate new and improved styling opportunities for vehicle manufacturers and other manufacturers. Air duct outlets according to embodiments of the present invention are not limited to uses within vehicles (e.g., automobiles, trucks, boats, aircraft, etc.), but may also be utilized in residential and commercial heating, ventilating and air conditioning (HVAC) applications.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
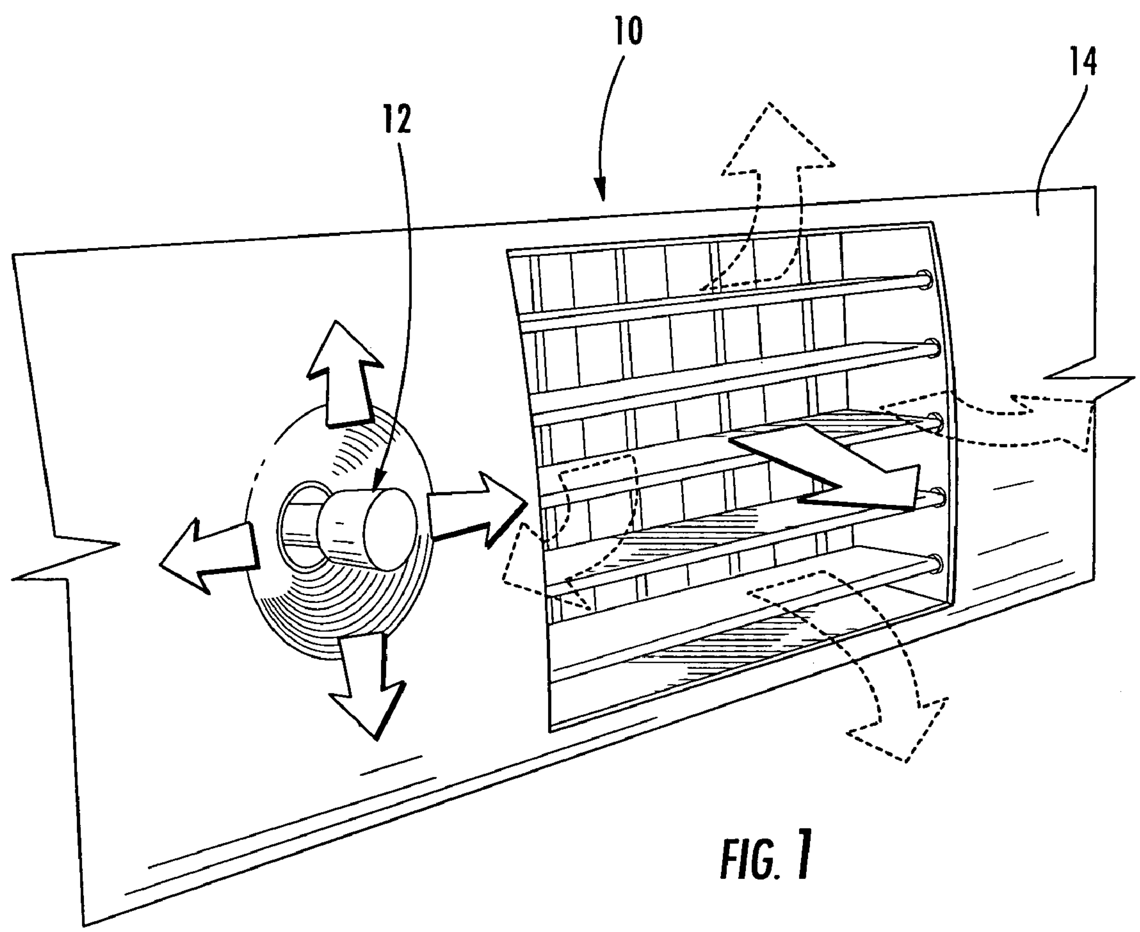
FIG. 1 is a front, perspective view of an air duct outlet, according to embodiments of the present invention.
Figure 2:
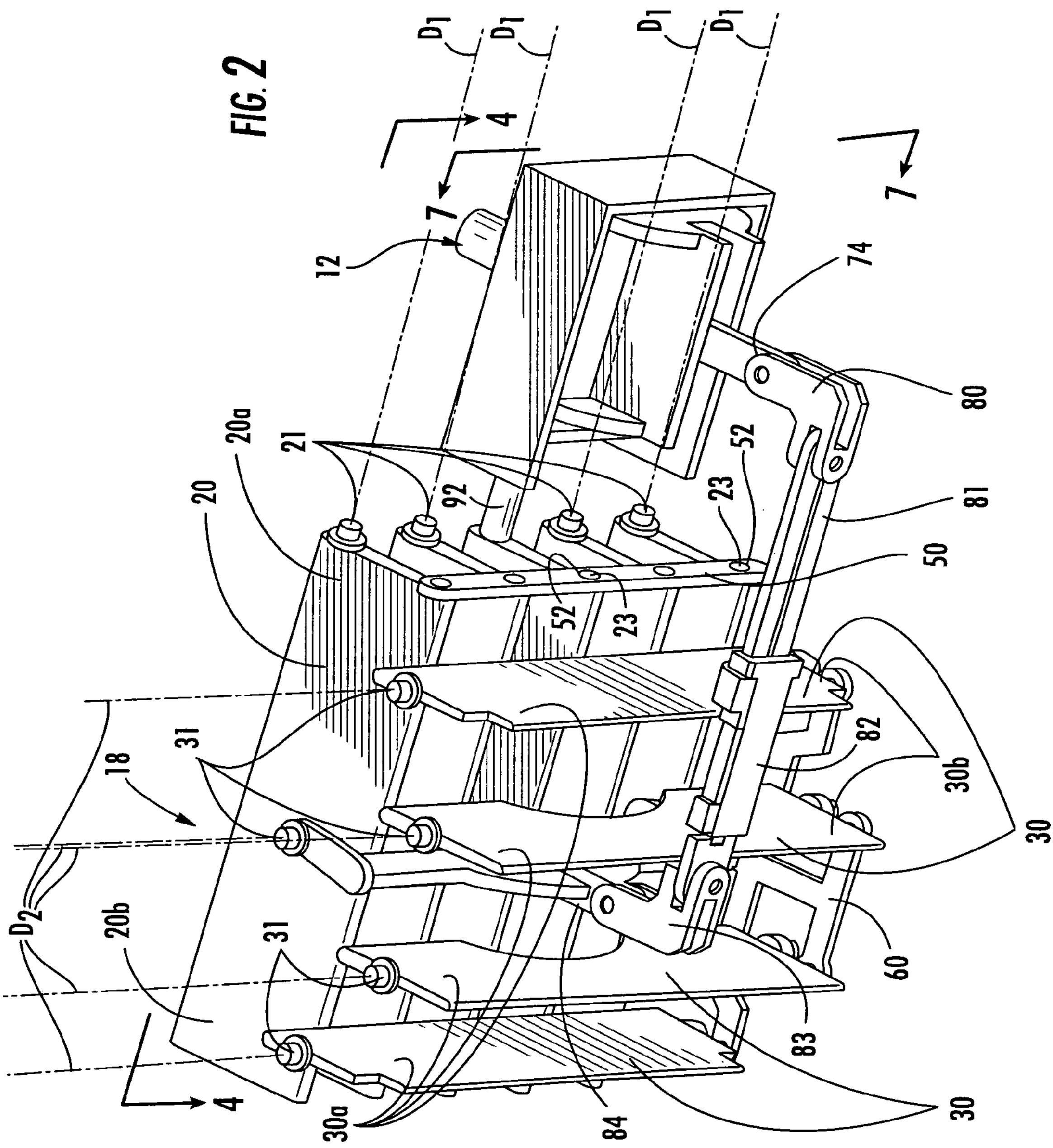
FIGS. 2-3 are rear, perspective views of the louver assembly and remote joystick control of the air duct outlet of FIG. 1.
Figure 3:
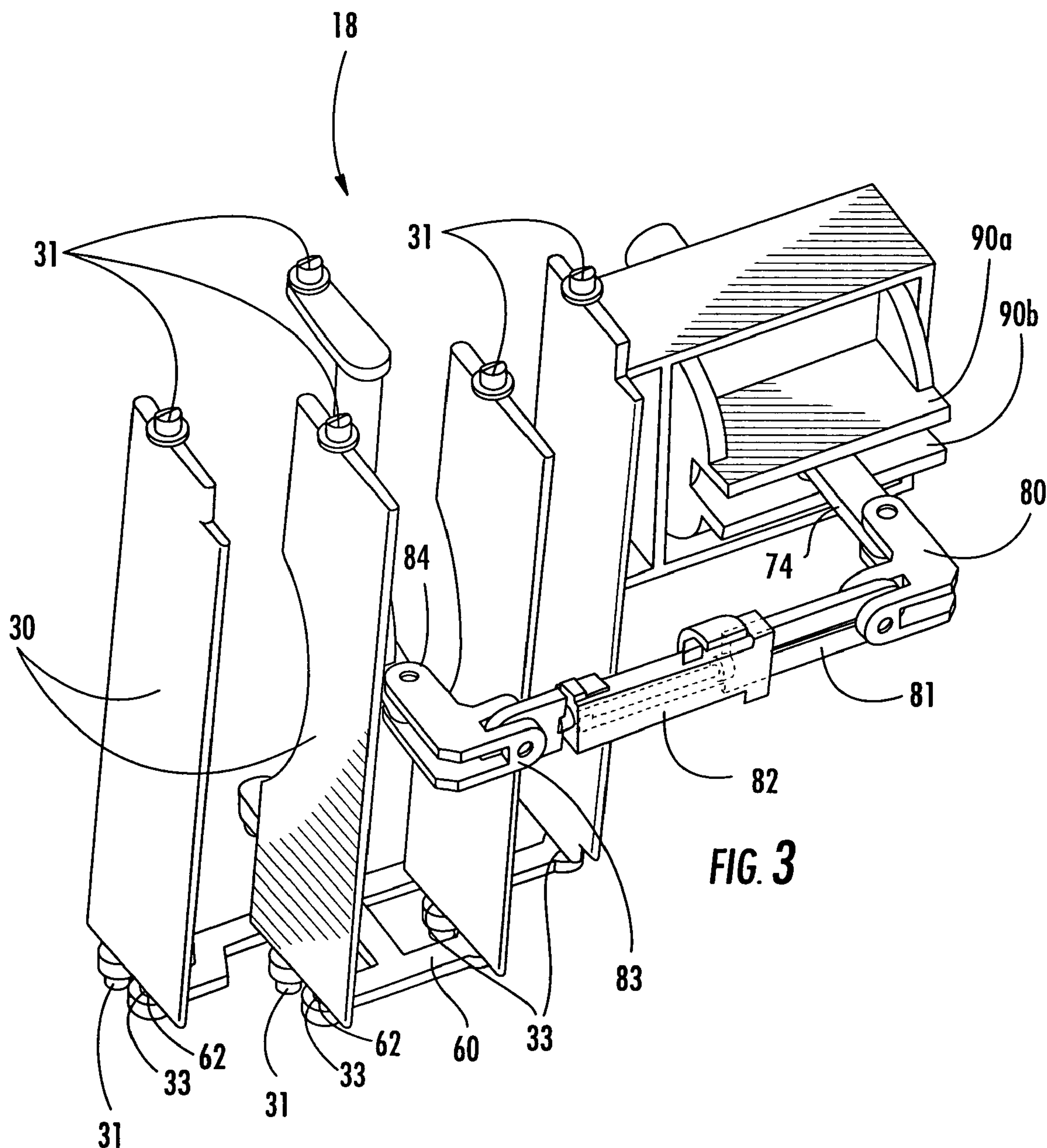
Figure 4:
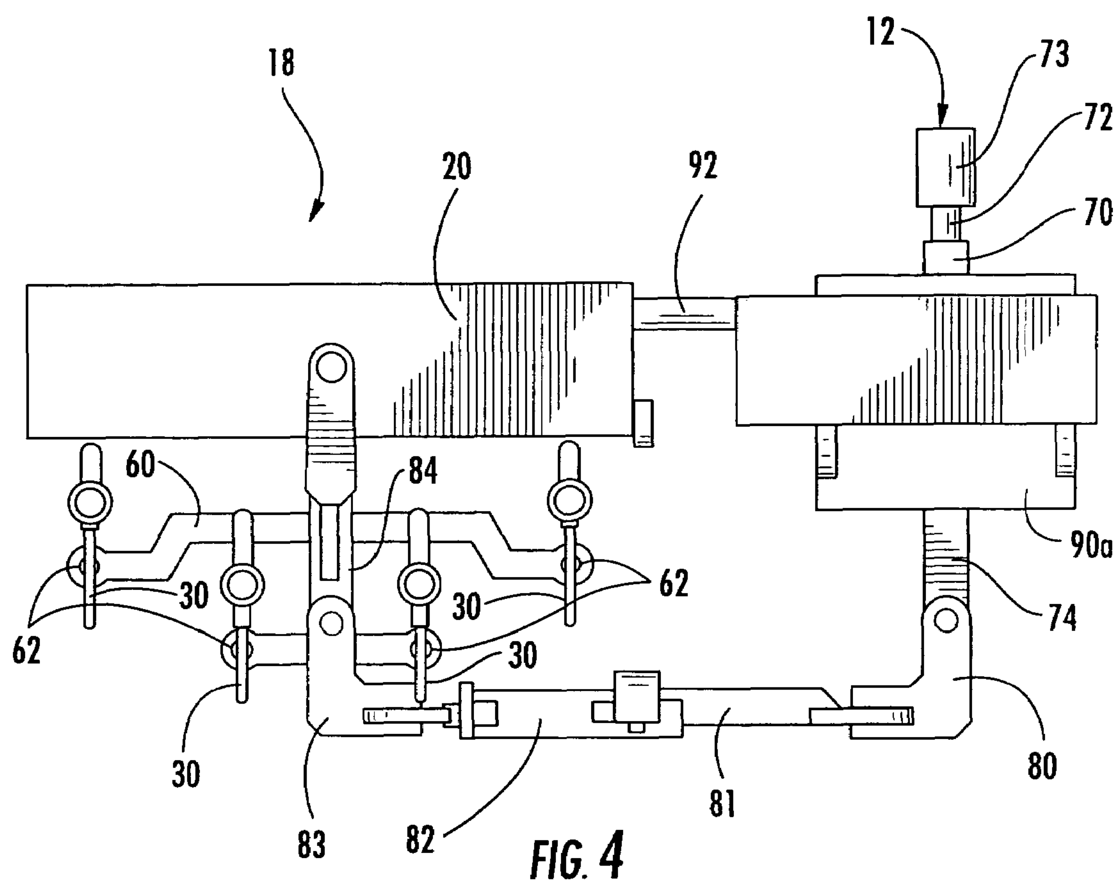
FIG. 4 is a top plan view of the louver assembly and remote joystick control taken along lines 4-4 of FIG. 2.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Referring to FIG. 1, an air duct outlet 10, according to embodiments of the present invention, is illustrated. The illustrated air duct outlet 10 is designed for use within passenger compartments of vehicles including, but not limited to, automobiles, trucks, trains, boats, aircraft, and the like. Moreover, it is understood that air duct outlets according to embodiments of the present invention may be utilized in various environments (e.g., structures, buildings, etc.) and are not limited to use in vehicles.

The illustrated air duct outlet 10 is disposed within an opening in an instrument panel 14 of a vehicle. A remotely-located joystick 12 extends through a second opening in the instrument panel 14 that is spaced apart from the air duct outlet 10, as illustrated. The joystick 12 is utilized to adjust air flow through the air duct outlet 10, as described below. As would be understood by those skilled in the art, the air duct outlet 10 is connected to a source of air flow, such as a fan, to supply heated and/or cooled air (as well as ambient outside air) to an interior compartment of a vehicle.

Referring to FIGS. 2-9, the illustrated air duct outlet 10 (FIG. 1) includes a louver assembly 18 having a first set of elongated louvers 20 that are in generally parallel, spaced-apart relationship with each other, and a second set of elongated louvers 30 that are in generally parallel, spaced-apart relationship with each other. The louvers in the first and second sets of louvers 20, 30 extend along, and pivot about, respective transverse directions (indicated by $D_1$ and $D_2$). In the illustrated embodiment, the first and second sets of louvers 20, 30 are substantially orthogonal relative to each other. The pivot axes of the first and second sets of louvers may, but need not, lie in the same plane (i.e., coplanar). According to embodiments of the present invention, pivot axes of the first and second sets of louvers may lie in separate, different planes.

Embodiments of the present invention are not limited to the illustrated generally rectangular configuration of the first and second sets of louvers 20, 30. Louvers having various shapes and sizes may be utilized.

The first set of louvers 20 are pivotally secured within a housing (not illustrated) via respective pins 21 that extend from each end portion 20*a*, 20*b* of each louver 20, as illustrated. Each pin 21 engages a respective aperture formed in the housing and defines an axis $D_1$ about which each louver 20 pivots, as would be understood by those skilled in the art. The apertures are in spaced-apart, adjacent relationship to maintain the desired spacing of the louvers 20.

The first set of louvers 20 are movably connected together along end portion 20*a* thereof via a first connecting member 50. Pivotal movement of any one of the louvers 20 causes pivotal movement of the remaining louvers 20 because of the first connecting member 50. In the illustrated embodiment, the first connecting member 50 has a slender, elongated configuration with a plurality of spaced-apart apertures 52 formed therein. Each aperture 52 is configured to operably engage a respective pin 23 extending from each louver end portion 20*a*.

Embodiments of the present invention are not limited to the illustrated configuration of the first connecting member 50. A member serving the function of the first connecting member 50 may have various shapes and configurations, and may pivotally connect all (or only some) of the first set of louvers 20 in various ways.

The second set of louvers 30 are pivotally secured to the housing via respective pins 31 that extend from each end portion 30*a*, 30*b* of each louver 30, as illustrated. Each pin 31 engages a respective aperture formed in the housing and defines an axis $D_2$ about which each louver 30 pivots, as would be understood by one skilled in the art. The apertures are in spaced-apart, adjacent relationship to maintain the desired spacing of louvers 30.

The second set of louvers 30 are movably connected together along end portion 30*b* thereof via a second connecting member 60. Pivotal movement of any one of the louvers 30 causes pivotal movement of the remaining louvers 30 because of connecting member 60. In the illustrated embodiment, the second connecting member 60 has a plurality of spaced-apart apertures 62 (FIG. 4) formed therein. Each aperture 62 is configured to operably engage a respective pin 33 (FIG. 3) extending from a respective louver end portion 30*b*.

Embodiments of the present invention are not limited to the illustrated configuration of the second connecting member 60. A member serving the function of the second connecting member 60 may have various shapes and configurations, and may pivotally connect all (or only some) of the second set of louvers 30 in various ways.

Pivotal movement of the first and second sets of louvers 20, 30 is accomplished via a remotely located joystick 12. The term "remotely located" is intended to mean that the joystick 12 is physically spaced-apart from an air duct outlet so as not to interfere with air flowing from an air duct outlet. The distance that a joystick can be spaced-apart from an air duct outlet that it controls is not limited and can be virtually any distance within a vehicle or other structure incorporating embodiments of the present invention.

Figure 8:
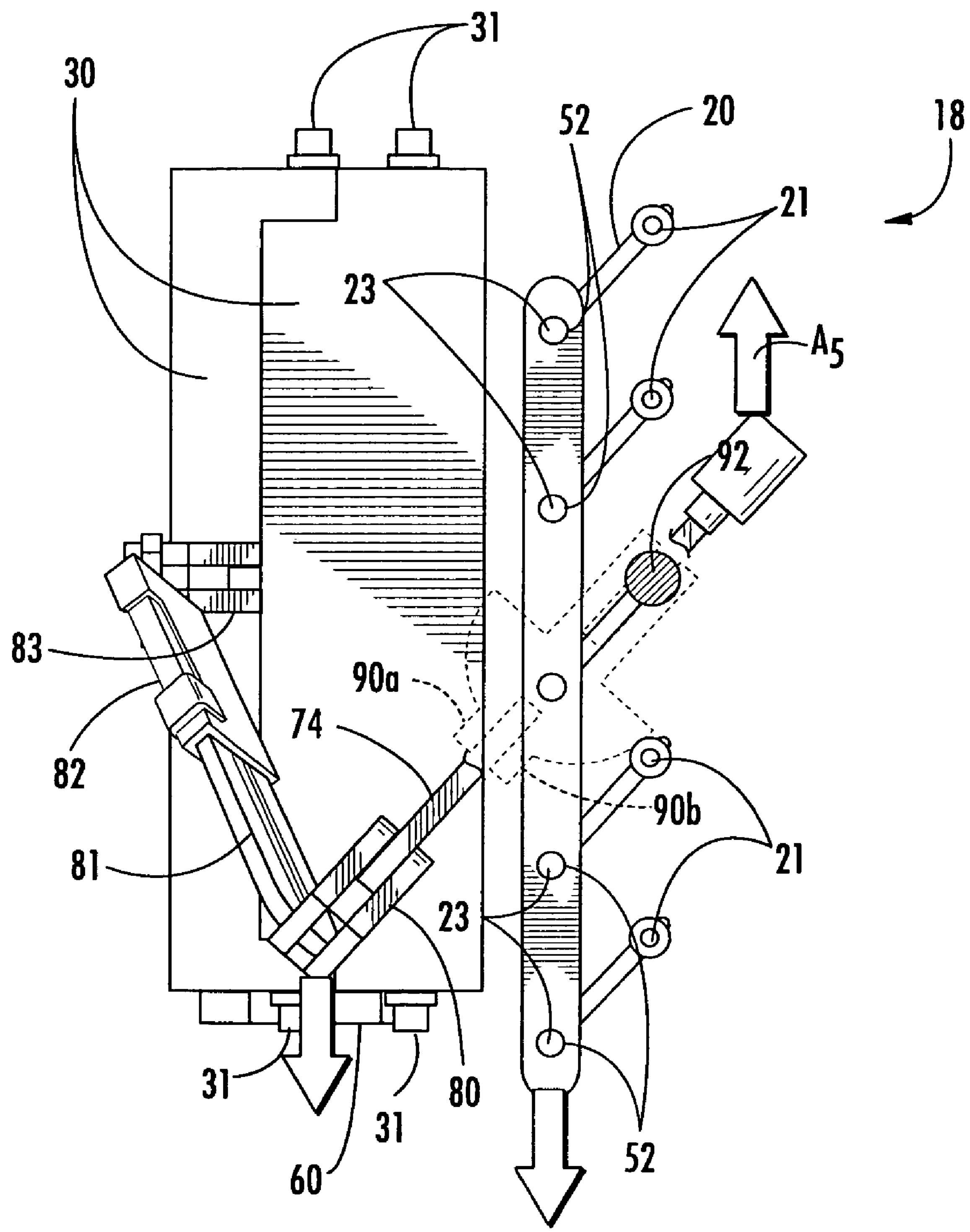
FIGS. 8-9 illustrate movement of the second set of louvers by the remote joystick control.
Figure 9:
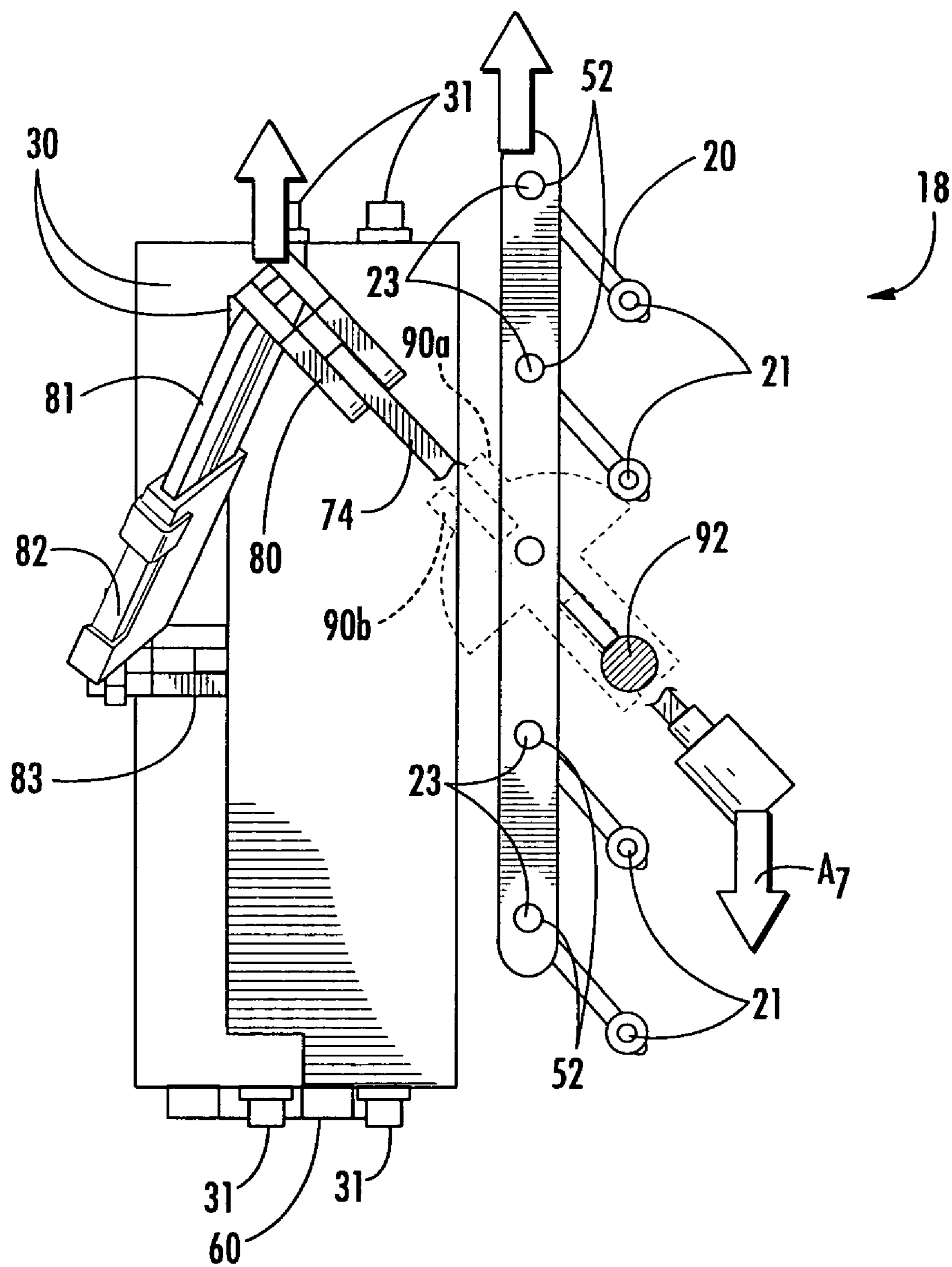

Joystick 12 includes a shaft 70 having a proximal end portion 72 and a distal end portion 74. A knob 73 is secured to the proximal end portion 72 of the joystick shaft 70, as illustrated. A series of linkages 80,81,82,83 connects distal end portion 74 to a yoke member 84. In the illustrated embodiment, linkage 80 is connected to the joystick distal end 74 via a pin connection. Linkage 80 is connected to linkage 81 via a pin connection. Linkage 81 is slidably secured to linkage 82, as illustrated. Linkage 82 is connected to linkage 83 via a pin connection. Linkage 83 is connected to the yoke 84 via a pin connection. As illustrated in FIGS. 8-9, the linkages 80,81, 82,83 are interconnected such that up and down movement of the joystick 12 does not cause movement of the second set of louvers 30.

Figure 5:
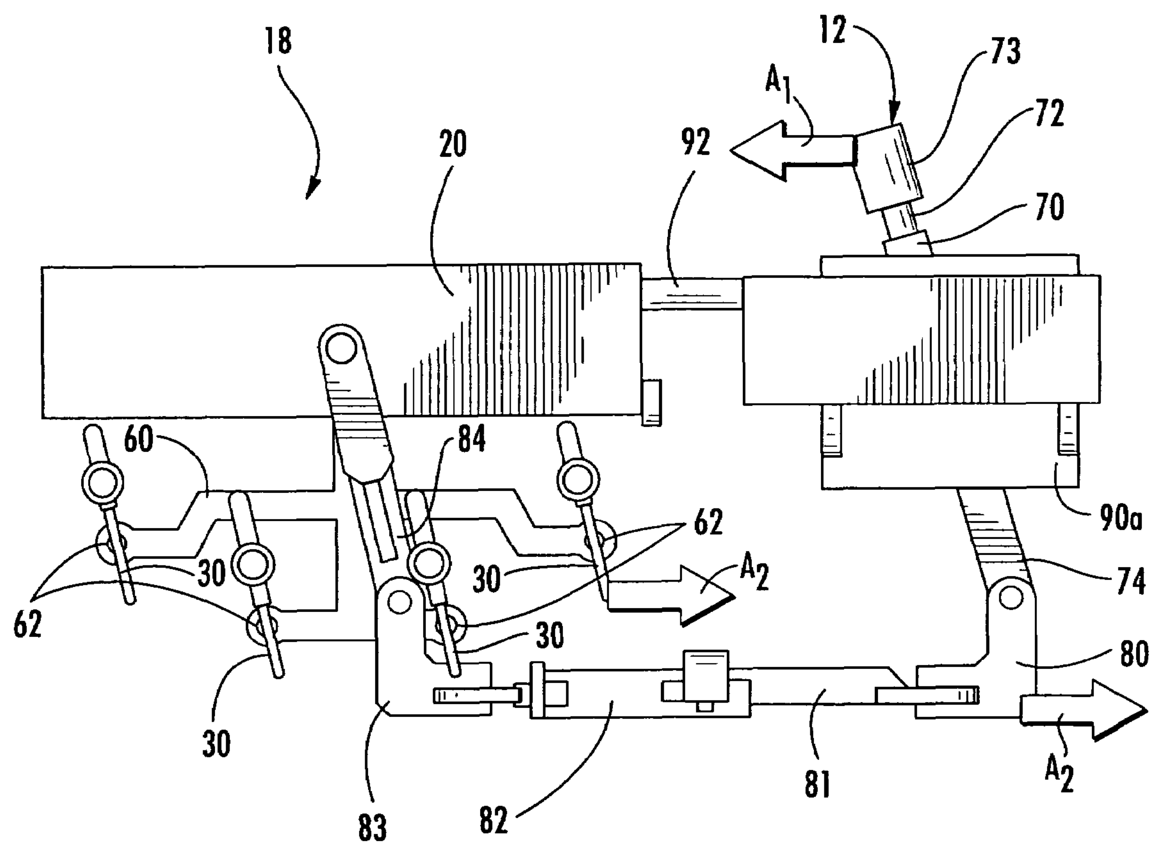
FIGS. 5-6 illustrate movement of the first set of louvers by the remote joystick control.
Figure 6:
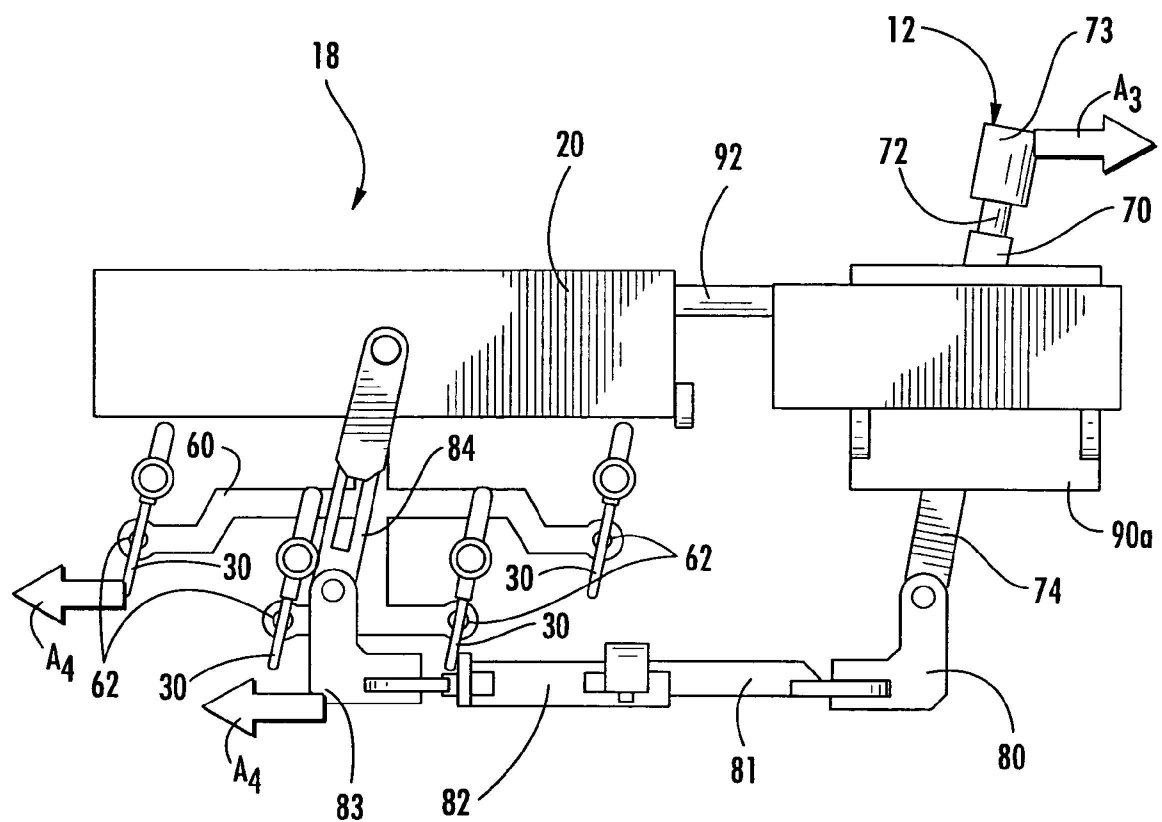
Figure 7:
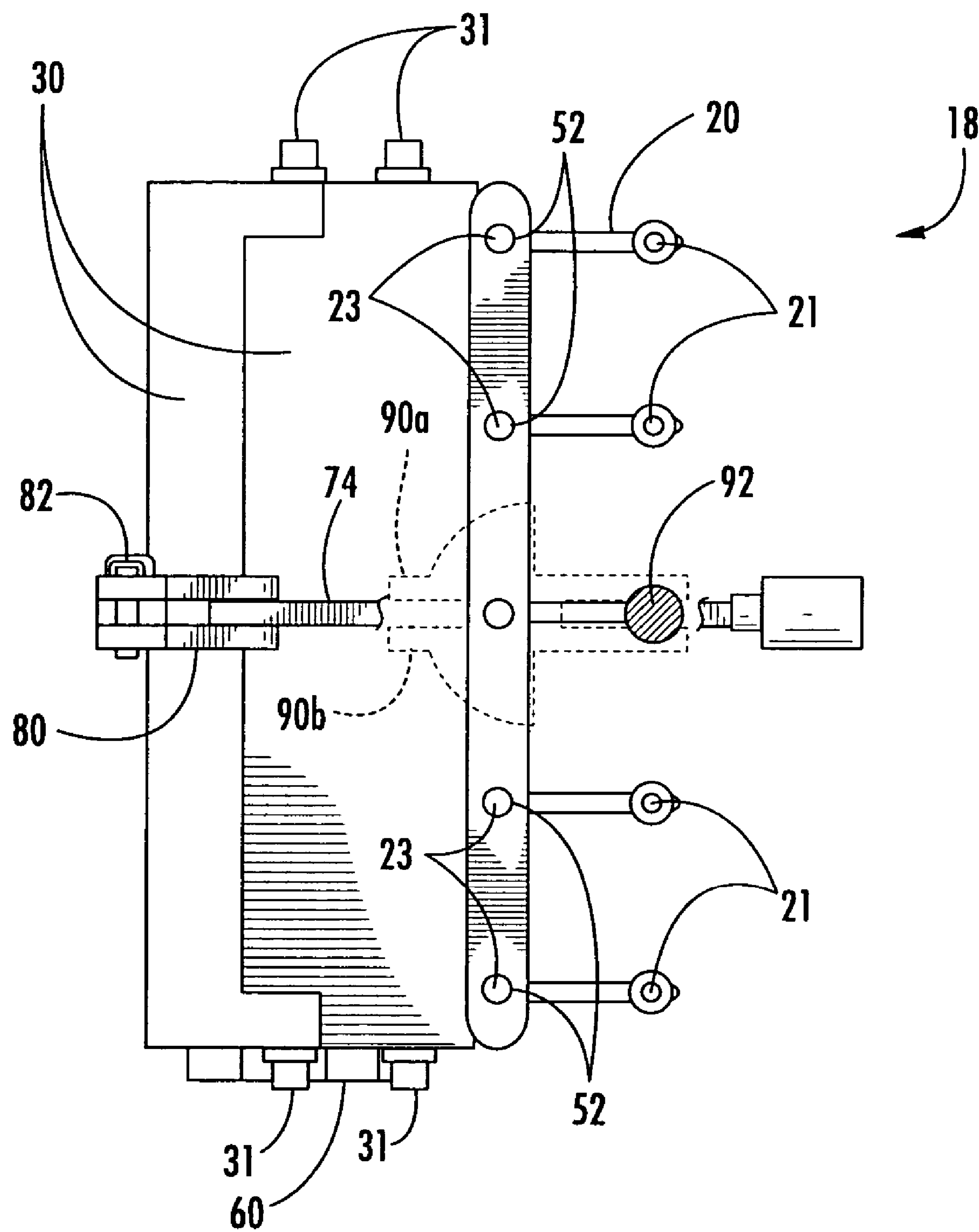
FIG. 7 is a side elevation view of the louver assembly and remote joystick control taken along lines 7-7 of FIG. 2.

Yoke member 84 is connected to one of the louvers 30 in the second set and causes the second set of louvers 30 to pivot when a side-to-side (i.e., horizontal) motion is imparted to the joystick 12, as illustrated in FIGS. 5-6. For example, when joystick 12 is moved in the direction indicated by arrow $A_1$, the louvers 30 pivot in the direction indicated by arrow $A_2$ (FIG. 5). Similarly, when joystick 12 is moved in the direction indicated by arrow $A_3$, the louvers 30 pivot in the direction indicated by arrow $A_4$ (FIG. 6).

In the illustrated embodiment, the joystick shaft 70 extends between two panels 90*a*, 90*b* (FIG. 3) that are pivotally secured to the housing. A shaft 92 (FIG. 2) is connected at one end to one or both of the two panels 90*a*, 90*b* and at the other end to one of the louvers 20 in the first set. Up and down (i.e., vertical) movement (indicated by arrows As (FIG. 8) and $A_7$ (FIG. 9)) of the joystick 12 causes the shaft 92 to rotate which causes the first set of louvers 20 to pivot without causing the second set of louvers 30 to move. Upward movement As of the joystick 12 causes the linkages 81 and 82 to slide relative to one another, causes linkages 80 and 81 to pivot relative to each other, and causes linkages 82 and 83 to pivot relative to each other, as illustrated in FIG. 8. Downward movement $A_7$ of the joystick 12 causes the linkages 81 and 82 to slide relative to one another, causes linkages 80 and 81 to pivot relative to each other, and causes linkages 82 and 83 to pivot relative to each other, as illustrated in FIG. 9.

This movement of the linkages 80,81,82,83 "absorbs" the motion of the joystick 12 and does not translate the up and down joystick movement to the second set of louvers 30. In other words, the joystick linkages 80,81,82,83 move relative to one another without translating the up and down (i.e., vertical) movement ($A_5$, $A_7$) of the joystick 12 to the second set of louvers 30.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. An air duct outlet, comprising:

a housing comprising a front wall having an opening therein through which air is allowed to flow;

a louver assembly operably coupled with the housing, wherein the louver assembly is configured to adjust a direction of air flowing through the front wall opening, wherein the louver assembly comprises:

a first set of louvers pivotally secured within the housing in spaced-apart adjacent relationship, wherein the louvers in the first set are operably connected together such that pivotal movement of any one of the louvers in the first set causes pivotal movement of the remaining louvers in the first set; and a second set of louvers pivotally secured within the housing in spaced-apart adjacent relationship, wherein the louvers in the second set are operably connected together such that pivotal movement of any one of the louvers in the second set causes pivotal movement of the remaining louvers in the second set;

a joystick remotely positioned relative to the front wall opening such that the joystick does not interfere with air flowing through the front wall opening;

a shaft coupled to the joystick and to one of the louvers in the first set, wherein the shaft is configured to pivot the first set of louvers in response to vertical movement of the joystick; and first, second, third and fourth linkages, wherein the first linkage is connected to the joystick, the second linkage is pivotally connected to the first linkage, the second and third linkages are slidably connected, the third linkage is pivotally connected to the fourth linkage, and the fourth linkage is connected to one of the louvers in the second set, wherein the linkages pivot the second set of louvers in response to horizontal movement of the joystick, and wherein, in response to vertical movement of the joystick, the first and second linkages pivot relative to each other, the third and fourth linkages pivot relative to each other, and the second and third linkages slide relative to one another and absorb the vertical movement of the joystick without translating the vertical movement of the joystick to the second set of louvers.

2. The air duct outlet of claim 1, wherein the housing front wall comprises a second opening, and wherein the joystick extends through the second opening.

3. The air duct outlet of claim 1, wherein the louvers in the first set of louvers are substantially parallel with each other.

4. The air duct outlet of claim 1, wherein the louvers in the second set of louvers are substantially parallel with each other.

5. The air duct outlet of claim 1, wherein the louvers in the first set of louvers are substantially orthogonal with the louvers in the second set of louvers.

6. The air duct outlet of claim 1, wherein the second set of louvers are positioned upstream from the first set of louvers within the housing.

* * * * *